United States Patent [19]

Lawrenz et al.

[11] Patent Number: 5,055,168

[45] Date of Patent: Oct. 8, 1991

[54] BINDER FOR CATHODIC ELECTROCOATING

[76] Inventors: Dirk Lawrenz, Neumuehle, 6733 Hassloch; Eberhard Schupp, 29 Theodor-Storm-Strasse, 6718 Gruenstadt; Thomas Schwerzel, 51 Budapester Strasse, 6700 Ludwigshafen, all of Fed. Rep. of Germany

[21] Appl. No.: 235,611

[22] Filed: Aug. 24, 1988

[30] Foreign Application Priority Data

Aug. 28, 1987 [DE] Fed. Rep. of Germany ....... 3728762

[51] Int. Cl.$^5$ .............................................. C25D 13/00
[52] U.S. Cl. ............................. 204/181.7; 204/180.2; 204/299 EC; 523/415; 523/417; 525/528; 528/45; 428/457
[58] Field of Search ........... 204/181.7, 299 EC, 180.2; 523/415, 417; 525/528; 528/45; 428/457

[56] References Cited

U.S. PATENT DOCUMENTS

| | | |
|---|---|---|
| 3,799,854 | 3/1974 | Jerabek . |
| 3,922,253 | 11/1975 | Jerabek et al. . |
| 3,935,087 | 1/1976 | Jerabek et al. . |
| 3,947,338 | 3/1976 | Jerabek et al. . |
| 3,984,299 | 10/1976 | Jerabek et al. . |
| 4,007,154 | 2/1977 | Schimmel et al. . |
| 4,529,492 | 7/1985 | Buchholz et al. ................. 204/181.7 |
| 4,557,814 | 12/1985 | Schupp et al. . |
| 4,568,729 | 2/1986 | Schupp et al. . |
| 4,608,416 | 8/1986 | Schupp et al. ................... 204/181.7 |
| 4,690,740 | 9/1987 | Cringle et al. ....................... 204/147 |
| 4,699,937 | 10/1987 | Loch et al. . |
| 4,721,758 | 1/1988 | Schupp et al. . |

FOREIGN PATENT DOCUMENTS 1303480 1/1973 United Kingdom .

Primary Examiner—John F. Niebling
Assistant Examiner—David G. Ryser

[57] ABSTRACT

Binders for cathodic electrocoating which are water-dilutable on protonation with acids contain (A) from 50 to 95% by weight of a polymerization, polycondensation or polyaddition product having an average molecular weight of from 200 to 20,000, primary and/or secondary hydroxyl groups, primary, secondary and/or tertiary amino groups and an amine number of from 30 to 150 and (B) from 5 to 50% by weight of a mixture of
  (a) blocked polyisocyanates and/or urea condensation products and
  (b) one or more phenolic Mannich bases obtainable from
    ($b_1$) one or more polycyclic polyphenols,
    ($b_2$) formaldehyde or a formaldehyde-donating compound and
    ($b_3$) one or more secondary aliphatic amines.

6 Claims, No Drawings

BINDER FOR CATHODIC ELECTROCOATING

The present invention relates to binders for cathodic electrocoating which are water-dilutable on protonation with an acid, containing
(A) from 50 to 95% by weight of a polymerization, polycondensation or polyaddition product having an average molecular weight of from 200 to 20,000, primary and/or secondary hydroxyl groups, primary, secondary and/or tertiary amino groups and an amine number of from 30 to 150 and
(B) from 5 to 50% by weight of a mixture of
  (a) blocked polyisocyanates and/or urea condensation products and
  (b) one or more phenolic Mannich bases obtainable from
    ($b_1$) one or more polycyclic polyphenols,
    ($b_2$) formaldehyde or a formaldehyde-donating compound and
    ($b_3$) one or more secondary aliphatic amines, and to the use thereof.

BACKGROUND OF THE INVENTION

Most of the electrocoating paints of high throw and good corrosion protection customary these days consist of amino-epoxy resins based on bisphenol A (2,2-bis(4-hydroxyphenyl)propane) and amines and/or amino alcohols, as described for example in DE-A-3,422,457, DE-A-3,325,061 and DE-A-3,444,110. The crosslinking of these binders is usually thermal in the course of baking at from 120° to 200° C. Crosslinking can be effected by reaction with blocked polyisocyanates as described for example in DE-A-2,057,799, DE-A-2,131,060, DE-A-2,252,536, DE-A-2,265,195, DE-A-2,363,074 and DE-A-2,634,211. Urea condensation products as described in DE-A-3,311,514 can likewise be used.

Another kind of crosslinking consists in the use of phenolic Mannich bases as described for example in DE-A-3,422,257. To obtain sufficiently low baking temperatures if these crosslinking agents are used, binders having a relatively high proportion of primary or secondary amino groups are required.

Although the coating compositions thus obtained have on the whole a positive range of properties, they do show defects in certain areas which appear to disqualify them from use in particularly demanding sectors, for example the coating of car bodies in the automotive industry. Binder systems based on blocked isocyanates or urea condensation products showed appreciable differences in adhesion to differently pretreated steels. On crosslinking with Mannich bases it was in particular the adhesion to nonpretreated metal and the thickness of the paint film obtained which were unsatisfactory.

SUMMARY OF THE INVENTION

It is an object of the present invention to remedy the aforementioned disadvantages of electrocoating paint systems.

We have found, surprisingly, that this object is achieved in that a mixture of Mannich base crosslinkers and blocked isocyanates or urea condensation products substantially avoids the aforementioned disadvantages of the individual components. It is here particularly surprising that even if the Mannich base crosslinker accounts for a relatively high proportion of the mixture with a binder having relatively few primary/secondary amino groups good crosslinking is obtainable at low baking temperatures.

DESCRIPTION OF THE INVENTION

The present invention accordingly provides a binder for cathodic electrocoating which is water-dilutable on protonation with an acid, containing
(A) from 50 to 95% by weight of a polymerization, polycondensation or polyaddition product having an average molecular weight of from 200 to 20,000, primary and/or secondary hydroxyl groups, primary, secondary and/or tertiary amino groups and an amine number of from 30 to 150 and
(B) from 5 to 50% by weight of a mixture of
  (a) blocked polyisocyanates and/or urea condensation products and
  (b) one or more phenolic Mannich bases obtainable from
    ($b_1$) one or more polycyclic polyphenols,
    ($b_2$) formaldehyde or a formaldehyde-donating compound and
    ($b_3$) one or more secondary aliphatic amines, and the use thereof for coating an article having an electrically conducting surface.

The present invention further concerns the coated article obtained by application of a coating agent prepared according to the invention and baking.

In what follows, the structural components of the synthetic resin according to the invention will be described in detail:

Component (A) can be any polymerization, polycondensation or polyaddition product having an average molecular weight of from 200 to 20,000, preferably of from 1,200 to 4,000, primary and/or secondary hydroxyl groups, primary, secondary and/or tertiary amino groups and an amine number of from 30 to 150, preferably of from 45 to 120, particularly preferably of from 70 to 100.

The polymerization product can be for example a polyacrylate prepared by copolymerizing from 10 to 70 parts by weight of methacrylic esters or amides bearing a secondary amino group, for example N-isopropylaminopropylmethacrylamide, with from 30 to 90% by weight of other monomers, such as (meth)acrylic esters, acrylonitriles, styrene, etc. These polymerization products can serve as starting materials for the reactions with polyepoxies described hereinafter, in the course of which the hydroxyl groups are introduced.

Suitable polycondensation products are for example those of polycarboxylic acids and polyamines. Reaction products of dimerized or trimerized fatty acids and polyamines obtained by reaction of one or more of the polyepoxy compounds described hereinafter with excess diamine and removal of the excess after complete conversion of the epoxy groups are suitable for use as component (A).

Suitable polyaddition products are in particular reaction products of polyepoxy compounds with amines. The use of amino-epoxy resins is preferred for basecoats of high corrosion protection level. Examples of amino-epoxy resins are reaction products of resins containing, preferably, terminal epoxy groups with saturated and/or unsaturated secondary and/or primary amines or amino alcohols. The latter may have been modified on the alkyl radical in the form of at least one primary and/or secondary hydroxyl group, in the form of a monoalkylamino or dialkylamino group, and/or in the form of a primary amino group which is protected by ketiminization.

The epoxy resin can be any desired materials, in particular if they have an average molecular weight of from 300 to 6,000 and contain on average from 1.5 to 3.0 epoxy groups per molecule, preferably compounds having 2 epoxy groups per molecule. Preference is given to epoxy resins having average molecular weights of from 350 to 5,000, in particular of from 350 to 2,000. Particularly preferred epoxy resins are for example glycidyl ethers of polyphenols which contain on average no fewer than 2 phenolic hydroxyl groups in the molecule and are preparable in a conventional manner by etherification with an epihalohydrin in the presence of alkali. Examples of suitable phenol compounds are 2,2-bis(4-hydroxyphenyl)propane (bisphenol A), 4,4'-dihydroxybenzophenone, 1,1-bis(4-hydroxyphenyl)ethane, 1,1-bis(4-hydroxyphenyl)isobutane, 2,2-bis(4-hydroxytert-butylphenyl)propane, bis(4-hydroxynaphthyl)methane and 1,5-dihydroxynaphthalene. In some cases it is desirable to use aromatic epoxy resins having a higher molecular weight. They are obtained by reacting the abovementioned diglycidyl ethers with a polyphenol, for example 2,2-bis(4-hydroxyphenyl)propane, and then further reacting the products obtained with an epichlorohydrin to prepare polyglycidyl ethers.

A further suitable class of epoxy resins are polyglycidyl ethers of phenolic novolak resins, by means of which the functionality can be increased from 2 to about 6 glycidyl groups per molecule. Also suitable are polyglycidyl ethers of polyhydric alcohols, such as of ethylene glycol, diethylene glycol, triethylene glycol, 1,2-propylene glycol, 1,3-propanediol, 1,5-pentanediol, 1,2,6-hexanetriol, glycerol and 2,2-bis(4-hydroxycyclohexyl)-propane. It is also possible to use polyglycidyl esters of polycarboxylic acids.

Of the preferred polyglycidyl ethers of polyphenols, those having epoxy equivalent weights within the range from 180 to 1,000 are particularly preferred. Aromatic polyepoxies having a higher epoxy equivalent weight can be prepared from those having a low epoxy equivalent weight and polyphenols.

The amino-epoxy resin can also be modified with saturated or unsaturated polycarboxylic acids and/or hydroxycarboxylic acids. Aliphatic, cycloaliphatic and/or aromatic polycarboxylic acids of different chain lengths are for example adipic acid, sebacic acid, fumaric acid, isophthalic acid and dimeric fatty acid. The hydroxyalkylcarboxylic acids used are lactic acid, dimethylpropionic acid or even carboxyl- and hydroxyl-containing polyesters. The reaction of excess polyglycidyl ether of low molecular weight with polycarboxylic acids and/or polyalcohols gives modified polyglycidyl ether intermediates which then react further with amines and/or amino alcohols.

It is also possible to use heterocyclic epoxy compounds, such as 1,3-diglycidyl-5,5-dimethylhydantoin, triglycidyl isocyanurate or diepoxies of bisimides.

The amino groups are introduced either by addition of reactive NH compounds onto the epoxy group or by reaction of ketimines as described for example in DE-A-3,444,110 which are obtained by reaction of a primary amine with a carbonyl compound with elimination of water, or by reacting the hydroxyl groups of the basic resin with basic monoisocyanates formed by reaction of aromatic and/or aliphatic and/or cycloaliphatic diisocyanates or polyisocyanates with dialkylamino alcohols, as described for example in DE-A-2,707,405. The reactive NH compounds used are primary monoalkylamines such as dialkylaminoalkylamine and/or preferably secondary monoamines such as dialkylamines, monoalkylhydroxyalkylamines or dihydroxyalkylamines. Examples of usable compounds are diethylamine, N,N'-dimethylaminopropylamine, N-methylaminoethanol, N-ethylaminoethanol and diethanolamine. If primary N-ethylaminoethanol and diethanolamine. If primary amines such as octylamin, monoethanolamine, N,N-dimethylaminopropylamine, N,N-diethylaminoethylamine, N,N-dimethylaminopentylamine or methoxypropylamine are used, the amine reacts with 1 or 2 epoxy groups, depending on the stoichiometric ratios present, to enlarge the molecule. In the case of primary and secondary diamines, chain lengthening takes place. The secondary diamines used, which are preferably long-chain diamines, are N,N'-dialkyldiaminoalkanes or reaction products of saturated glycidyl ethers or esters with primary diaminoalkanes, such as the addition product of hexamethylenediamine with 2 moles of the glycidyl ester of Versatic acid. The primary diamines used are preferably α, ω-diaminoalkanes, such as 1,6-diaminohexane, or amide-amines of dimeric fatty acids. To prevent multiple reaction of the primary amino groups, it is advantageous to protect the primary amino group by ketiminization with a carbonyl compound and to react it with the epoxy in this form.

The reaction of the amines with the epoxies starts at as low as room temperature and in general is exothermic. To obtain complete conversion, it is generally necessary to raise the temperature temporarily to from about 50° to 120° C. The metimine groups require a higher reaction temperature of from 80° to 150° C., preferably of from 110° to 130° C. The 1,2-epoxy-containing resin is dissolved in organic solvents, such as toluene, xylene or methyl isobutyl ketone, before addition of the amine.

The primary and/or secondary hydroxyl groups and amino groups important for the crosslinking process must be present in sufficient numbers. Secondary hydroxyl groups are formed in the reaction of epoxy groups with nucleophilic compounds such as phenols or amines.

Primary hydroxyl groups are preferably introduced into the binder via the reaction of alkanolamines with epoxy groups. Preferred compounds are N-methylethanolamine, N-ethylethanolamine and diethanolamine.

The introduction of primary amino groups into the basic resin can be effected most simply by adding a diprimary diamine component in excess to an epoxy resin containing at least one, preferably two, epoxy groups per molecule and, after the reaction has taken place, removing the excess of diamine. To this end it is possible to use a thin-film evaporation process or a steam distillation, as well as a simple distillation. An adequate number of primary amino groups is likewise obtained if only a smaller excess is used, this excess being so chosen that, after the reaction, only very little free diamine is present in the binder but, on the other hand, the resulting molecular weight is with-in the abovementioned limits. This diamine can be convert-ed in a conventional manner with a carbonyl compound into a ketimine, which offers the advantage of a controlled synthesis of the resin, since every ketimine group reacts only once with an epoxy group.

The introduction of primary amino groups can also be effected by reacting synthetic resins containing at least one, preferably no fewer than two, epoxy groups per molecule with an amino- and/or hydroxyl-containing ketimine and/or aldimine and/or polyamine. The preferred ketimine comprises reaction products of ketones and alkylamines containing secondary amino groups, such as methyl isobutyl ketone and diethylenetriamine. Here the reaction temperature is chosen in such a way that the ketimine group does not react with the epoxy. The ketimine therefore protects the primary amino group in such a way that a further functional group, preferably a secondary amino group, can easily be made to react with the epoxy resin.

Secondary amino groups can be obtained by the above-described method via a reaction of ketimine groups with epoxy groups at elevated temperatures.

On dispersion of the synthetic resins in water, unconverted ketimine groups hydrolyze to become primary amino groups while epoxy-ketimine adducts, by contrast, hydrolyze to secondary amino groups.

The above-described non-self-crosslinking amino-containing polymers (A) are used together with crosslinking agent mixtures (B). We have found, surprisingly, that mixtures of blocked isocyanates or urea condensation products with phenolic Mannich base crosslinkers have properties over the entire mixture composition range which were not to be expected from the individual components. Depending on the specific constitution of component (A), mixing ratios of from 0.05:1 to 19:1, preferably of from 0.25:1 to 4:1, are used.

The blocked polyisocyanates (a) are prepared by reacting a multifunctional isocyanate with not less than a stoichiometric amount of a monofunctional active hydrogen compound in the presence or absence of basic catalysts such as tertiary amines. The reaction product obtained reacts on heating with the amino or hydroxyl groups of component (A), and the protective group is re-eliminated. Compounds which are suitable for blocking the isocyanates contain only a single amine, amide, lactam, thiol or hydroxyl group. Preference is given for example to aliphatic or cycloaliphatic alcohols, such as 2-ethylhexanol, dialkylamino alcohols, such as dimethylaminoethanol, phenols such as cresol, oximes such as methyl ethyl ketoxime, amines such as dibutylamine, lactams such as ε-caprolactam, imides such as phthalimide, malonic acid or ethyl acetoacetate.

Suitable multifunctional isocyanates are aliphatic, cycloaliphatic and/or aromatic polyisocyanates having no fewer than two isocyanate groups per molecule. Examples thereof are the isomers or isomer mixtures of toluylene diisocyanate, toluylene triisocyanate, 4,4'-diphenylmethane diisocyanate, biphenyl tetraisocyanate and/or naphthyl tetraisocyanate, and hydrogenation products thereof such as dicyclohexylmethane diisocyanate. Preferred aliphatic diisocyanates are compounds of the formula I $$O=C=N-(CR_2)_r-N=C=O \quad (I)$$

where r is a whole number from 3 to 12, in particular 6 to 8, and each R, which may be identical to or different from the other, is hydrogen or lower alkyl of from 1 to 8 carbon atoms, preferably 1 or 2 carbon atoms. Examples thereof are hexamethylene diisocyanate, 1,6-diisocyanato-2,2,4-trimethylhexane and isophorone diisocyanate.

Mixed aliphatic/aromatic compounds are also suitable. Proven triisocyanates are products which are prepared by trimerization or oligomerization from diisocyanates or polyisocyanates and polyfunctional OH- or NH-containing compounds. They include for example the biuret from hexamethylene diisocyanate and water, the isocyanurate of hexamethylene diisocyanate, and the adduct of toluylene diisocyanate on trimethylolpropane. Molecular enlargement can also be effected by reaction with polyalcohols containing tertiary amino groups, such as N-methyldiethanolamine or triethanolamine or with polyamines containing tertiary amino groups, such as 3-methyl-3-(2-aminoethyl)aminopropylamine. To improve the solubility it is also possible to use chain-terminating N-dialkylamino alcohols, such as dimethylaminoethanol or N,N-dialkylalkylenediamines such as dimethylaminopropylamine or N,N-diethyl-N'-methyl-1,3-ethanediamine. To be able to prepare low-yellowing coatings, aliphatic and cycloaliphatic polyisocyanates are preferred.

To prepare the aminomethylated phenols (b) it is possible to use any polycyclic phenol (b₁) having no fewer than two phenol rings and carrying in the molecule no fewer than two hydrogens ortho to various hydroxyl groups. Examples of such polycyclic phenols are those of the general formula (II)

where the hydroxyl groups are ortho or para to X and X is a straight-chain or branched, divalent aliphatic radical of from 1 to 3 carbon atoms or SO₂, SO, O, CH₂—NRCH₂— (with R equal to alkyl of from 1 to 16 carbon atoms); the preferred polyphenol of the formula II is 2,2-bis(4-hydroxyphenyl)propane (bisphenol A). Further suitable polyphenols are low molecular weight reaction products of phenols and formaldehyde, so-called novolaks. The polyphenols required can also be produced in situ from monophenols and formaldehyde if during the aminomethylation the amount of formaldehyde used is greater than that required for equivalence with the amine used.

It is also possible to use reaction products of polyphenols and polyepoxies where phenolic OH groups have had to be used in excess compared with the epoxy groups. Such a chain-extended phenol can be prepared for example from 2 moles of bisphenol A and one mole of the diglycidyl ether of bisphenol A and epichlorohydrin.

Component (b₃) can be any secondary aliphatic amine. Preference is given to using those amines which have a certain volatility, for example those having a boiling point below 250° C. under a pressure of 1,000 mbar. Examples of suitable amines are dialkylamines such as dimethylaminediethylamine, methylethanolamine, ethylethanolamine, morpholine and piperidine. Particular preference is given to dialkylamines whose alkyl groups together contain from 5 to 15 carbon atoms, for example ethylpropylaminedioropylamine, diisopropylamine, dibutylamine, diisobutylamine, dipentylamine, dihexylamine, dicyclohexylamine and mixtures thereof. It is also possible to use primary amines, for example methylamine, ethylamine, propylamine or butylamine, in minor amounts.

The incorporation of amines (b₃) into the polyphenols is effected via a methylene bridge. This requires formaldehyde or a formaldehyde-donating compound (b₂), for example paraformaldehyde. This reaction of a phenol with an aldehyde and secondary amine is called aminomethylation or a Mannich reaction. The reaction can be carried out at room temperature, but advantageously is carried out at elevated temperatures of up to 150° C. No solvent is necessary. Nor is it necessary to remove the water formed in the course of the reaction. However, the water is removable without difficulties under reduced pressure or by means of an organic solvent as entrainer.

The Mannich reaction can also be carried out without solvent, provided the reaction products are liquid at the reaction temperature. However, it is also possible to use customary solvents such as alcohols, ketones, esters, ethers or hydrocarbons. Examples of suitable solvents are butanol, methyl isobutyl ketone, toluene and ethylglycol acetate.

To prepare the binders according to the invention, from 50 to 95, preferably from 60 to 90%, by weight of component (A) are mixed with from 5 to 50, preferably from 10 to 40%, by weight of component (B) either in the absence of solvent or advantageously diluted with organic solvents. Frequently it is advantageous to make the components more compatible by incipient condensation. To this end it is sufficient to heat the mixture of the components for some time, for example at from 35° to 110° C., preferably at from 50° to 100° C. The progress of the condensation, which essentially comprises the reaction of free methylol groups or aminomethylene groups of component (B) with the primary or secondary amino groups of component (A), can be monitored by measuring the increase in viscosity.

To prepare an aqueous dispersion, the binder composition (A)+(B) is admixed with an acid, for example formic acid, acetic acid or lactic acid, and then diluted to processing concentration. However, the binder composition may also be run slowly with stirring into acidified water. To prepare electrocoating baths the binder according to the invention may additionally be admixed with other binders, pigments and also further auxiliary and additive substances customary in electrocoating, such as fillers, corrosion inhibitors, dispersants, defoamers, solvents or even further resin components. Preferred corrosion inhibitors are copper(II) salts in a concentration of from 100 to 1,000 ppm. The electrocoating baths customarily have a solids content of from 5 to 30% by weight. Deposition customarily takes place at from 15° to 40° C. in the course of from 1 to 5 minutes while the applied voltage is within the range from 50 to 500 volts. The electrically conducting material to be coated, for example copper, aluminum or steel which may have been chemically pretreated, for example phosphated, is connected as the cathode in this deposition. The deposited film can be cured at from 120° to 200° C., preferably at from 130° to 180° C., in the course of from 5 to 45, preferably from 10 to 30, minutes.

I PREPARATION OF INTERMEDIATES

Intermediate 1

In a reaction vessel equipped with a water separator, 12,440 g of hexamethylenediamine, 18,660 g of dimeric fatty acid, 3,000 g of linseed oil fatty acid and 2,566 g of xylene were heated to 185° C. 1,150 g of water and 1,750 g of xylene were distilled off in the course of from 3 to 4 hours. The product had an amine number of 233 mg of KOH/g.

Intermediate 2

In a reaction vessel equipped with a water separator, 662 g of intermediate 1 were refluxed with 566 g of methyl isobutyl ketone for 10 hours, during which 52 g of water were distilled off. The product had an amine number of 134 and a solvent content of 25% by weight.

Component (A): Amino-epoxy resin

In a reaction vessel, 752 g of a diglycidyl ether of 2,2-bis(4-hydroxyphenyl)propane (bisphenol A) and epichlorohydrin having an equivalent weight of 190, 205 g of bisphenol A and 50 g of propylene glycol monophenyl ether were made to react by means of 0.3 g of trimethylphosphine. 3 hours at a reaction temperature of 130° C. gave a product having an epoxy equivalent weight of 430. 118 g of toluene were added to dilute the solids content to 85% by weight. 598 g of intermediate 2 and 72 g of ethyl ethanolamine were then added, and the mixture was heated to 120° C. 5 hours later epoxy was no longer detectable. 273 g of a 9:1 mixture of isobutanol and butylglycol were added to dilute to a solids content of 70% by weight. Crosslinking agent (B1): Urea condensation product 134 g of trimethylolpropane, 366 g of urea and 1,548 g of di-n-butylamine were heated together at 140° C. until the initially vigorous evolution of ammonia had largely ceased (about 1 hour). The temperature was then raised to 160° C. Once this temperature was reached 348 g of hexamethylenediamine were added in the course of one hour during which the internal temperature was slowly raised from 190° to 200° C. After 8 hours of reaction at 200° C. the mixture was cooled to 130° C. 2 g of dibutyltin dilaurate were added and, as the internal temperature was raised to 175° C., 1,110 g of di-n-butylamine were distilled off. The residue was diluted with 270 g of methyl isobutyl ketone to a solids content of about 80% by weight.

Crosslinking agent (B2): Blocked isocyanate 1,918 g of trimerized hexamethylene diisocyanate were introduced into a reaction vessel together with 1,376 g of methyl isobutyl ketone. 1,292 g of di-n-butylamine were added at 80° C. The reaction had ended after 2 hours. The product had a solids content of 70% by weight.

Crosslinking agent (B3): Mannich base 152 g of bisphenol A, 63 g of a diglycidyl ether of bisphenol A having an epoxy equivalent weight of 189 and 0.1 g of tributylphosphine were heated at 160° C. for 1 hour. Afterwards the epoxy was no longer detectable, and a chain-extended diphenol had formed. 53.8 g of isopropanol, 129 g of di-n-butylamine, 31.5 g of paraformaldehyde and 17.6 g of isobutanol were added and the mixture was heated at 80° C. for 2 hours. The product had a solids content of 80% by weight.

Preparation of a pigment paste 640 g of a diglycidyl ether based on bisphenol A and epichlorohydrin and having an epoxy equivalent weight of 485 and 160 g of a diglycidyl ether having an epoxy equivalent weight of 189 were mixed at 100° C. A second vessel was charged with 452 g of hexamethylenediamine and heated to 100° C., and 720 g of the hot epoxy resin mixture were added in the course of one hour during which the temperature was maintained at 100° C. After a further 30 minutes the temperature was raised and the pressure reduced to distill off the excess hexamethylenediamine, reaching a temperature of 205° C. and a pressure of 30 mbar. 57.6 g of stearic acid, 172.7 g of dimeric fatty acid and 115 g of xylene were then added. The water formed was then distilled off azeotropically at from 175° to 180° C. in the course of 90 minutes. 58 g of butylglycol and 322 g of isobutanol were then added. The product had a solids content of 70% by weight and a viscosity, measured at 75° C. with a plate/cone viscometer, of 2,240 mPas. 110 g of the resin thus obtained were ball-milled together with 36 g of ethylene glycol monobutyl ether, 3 g of acetic acid, 170 g of titanium dioxide, 18 g of lead silicate, 4.5 g of carbon black and 170 g of water to a particle size <7 μm.

Preparation of a dispersion

The respective components (A) and (B) were mixed in such amounts that the resulting mixture contained 137 g of solids in a mixing ratio of 70% of component (A) and 30% of component (B). After addition of 3.1 g of acetic acid, deionized water was added with stirring to prepare a 35% strength dispersion. 139 g of the above-specified pigment paste were added, followed by deionized water to make up to 1,000 g. The electrocoating baths thus prepared were stirred at 30° C. for 7 days. A panel connected as the cathode was then coated at the stated voltage for 2 minutes and subsequently baked at 160° C. for 20 minutes. Some of the aqueous electrocoating baths were admixed with 200 ppm of Cu(II)-acetate.

EXAMPLES

The following Examples show the application of the binder compositions according to the invention in cathodically depositable electrocoating baths:

| Example | Blocked isocyanate (B2) | Crosslinking agent Urea product (B1) | Mannich base (B3) |
|---|---|---|---|
| 1 | — | 58.7 parts | — |
| 2 | — | 14.7 parts | 38.5 parts |
| 3 | — | 44.0 parts | 12.8 parts |
| 4 | — | — | 51.4 parts |
| 5 | 58.7 parts | — | — |
| 6 | 14.7 parts | — | 38.5 parts |

Examples 1, 4 and 5 correspond to the situation described in the prior art, since in each case only one crosslinker was used. Examples 2, 3 and 6 are according to the invention.

The following tables give the application results:

| | Run 1 | Run 2 | Run 3 |
|---|---|---|---|
| Bath data: | | | |
| pH | 7.1 | 7.0 | 7.0 |
| Conductivity [μScm$^{-1}$] | 2170 | 2190 | 2160 |
| Deposition voltage [V] | 350 | 350 | 350 |
| Film properties: | | | |
| Film thickness [μm] | 16 | 9 | 16 |
| Underrusting [mm] | | | |
| 480 h ASTM* untreated panel | 2.6 | 5.4 | 4.8 |
| (with added Cu) | — | 4.9 | 3.1 |
| 1,000 h ASTM* phosphated panel | 0.35 | 0.12 | 0.34 |
| 10 cycles of climate cycling test** | 1.72 | 0.83 | 1.51 |

| | Run 4 | Run 5 | Run 6 |
|---|---|---|---|
| Bath data: | | | |
| pH | 7.0 | 7.2 | 7.2 |
| Conductivity [μScm$^{-1}$] | 2050 | 2220 | 2420 |
| Deposition voltage [V] | 350 | 300 | 340 |
| Film properties: | | | |
| Film thickness [μm] | 6 | 17 | 18 |
| Underrusting [mm] | | | |
| 480 h ASTM* untreated panel | 9.9 | — | 2.4 |
| (with added Cu) | 4.7 | — | 1.8 |
| 1,000 h ASTM* phosphated panel | 0.12 | 0.20 (720h) | 0.19 |
| 10 cycles of climate cycling test** | 0.77 | 3.50 | 1.09 |

*Salt spray test in accordance with German Standard Specification DIN 50.021
**In accordance with German Automotive Industry Association test VDA 621.415

As can be seen from the Examples, a high proportion of Mannich crosslinker (runs 2 and 6) in the mixture gives an appreciably better adhesion to nonpretreated steel while at the same time giving good results on phosphated steel. A high proportion of urea condensation product gives high film thicknesses together with an appreciably improved climate cycling test performance (run 3).

We claim:

1. A binder for cathodic electrocoating which is water-dilutable on protonation with an acid, containing
   (A) from 50 to 95% by weight of a polymerization, polycondensation or polyaddition product having an average molecular weight of from 200 to 20,000, having primary or second hydroxyl groups or a mixture thereof having primary, secondary or tertiary amino groups or a mixture thereof and having an amine number of from 30 to 150 and
   (B) from 5 to 50% by weight of a mixture of
      (a) blocked polyisocyanates and
      (b) one or more phenolic Mannich bases obtainable from
         (b$_1$) one or more polycyclic polyphenols,
         (b$_2$) formaldehyde or a formaldehyde-donating compound and
         (b$_3$) one or more secondary aliphatic amines.

2. A binder as defined in claim 1, containing a mixture (B) whose mixing ratio (a):(b) is within the range from 95:5 to 5:95.

3. A binder as defined in claim 1, containing an amino-epoxy resin as component (A).

4. A coating agent containing a binder as defined in claim 1 in the form of an aqueous dispersion with or without pigments, fillers, corrosion inhibitors and solvents.

5. A process for producing a coating on an electrically conducting substrate by means of cathodic electrocoating, which comprises using a coating agent as defined in claim 4.

6. A coated article obtainable using a coating agent as defined in claim 4.

* * * * *

UNITED STATES PATENT AND TRADEMARK OFFICE
CERTIFICATE OF CORRECTION

PATENT NO. : 5,055,168
DATED : October 8, 1991
INVENTOR(S) : Dirk Lawrenz et al It is certified that error appears in the above-identified patent and that said Letters Patent is hereby corrected as shown below:

Title page, item [73], should read --BASF Lacke ± Farben Aktiengesellschaft, Feb. Rep. of Germany--.

Before item [57] Abstract, please insert --Attorney, Agent or Firm-Keil & Weinkauf--.

Signed and Sealed this

Second Day of March, 1993

Attest:

STEPHEN G. KUNIN

*Attesting Officer*       *Acting Commissioner of Patents and Trademarks*